UNITED STATES PATENT OFFICE.

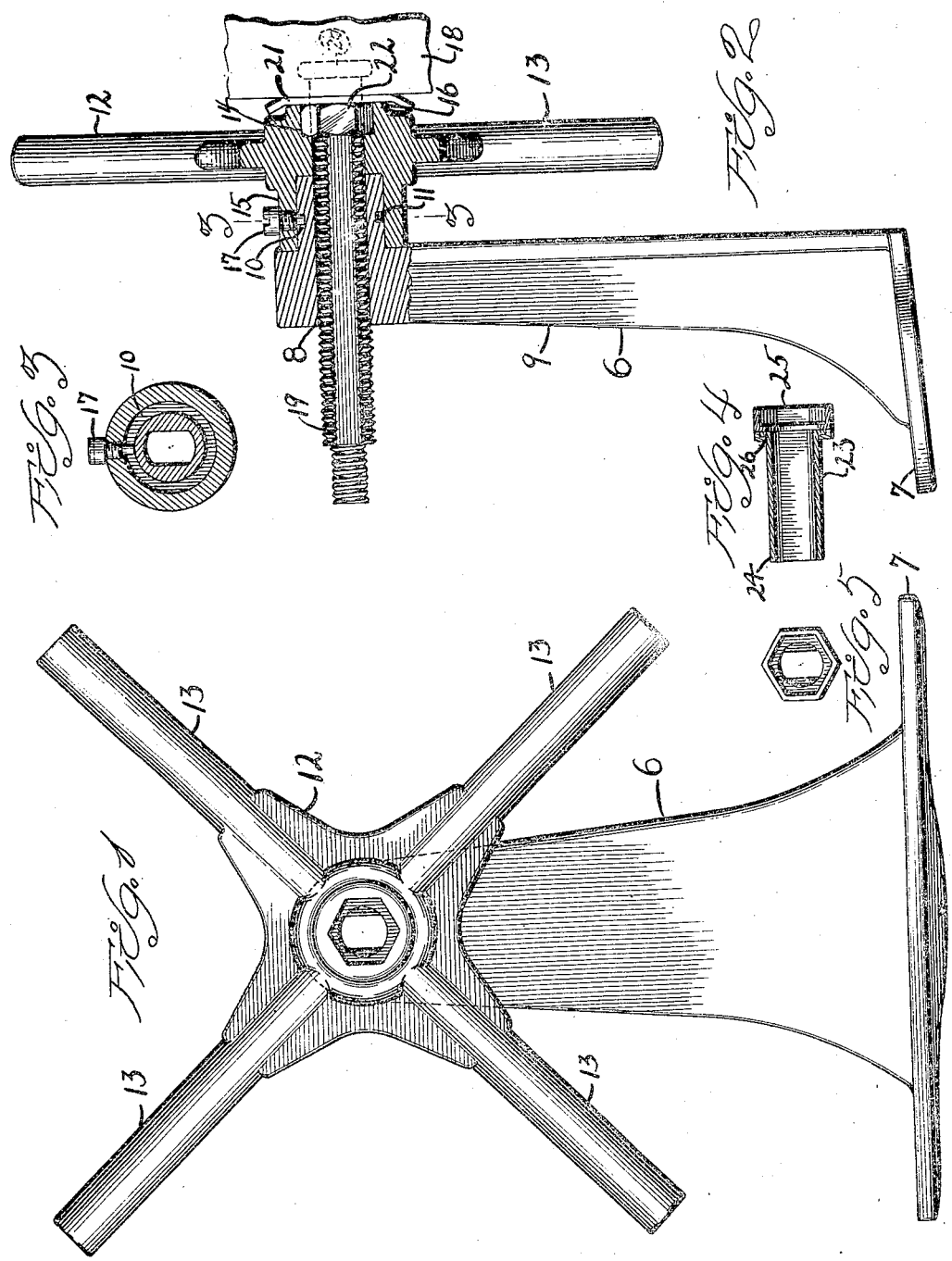

WILLIAM F. HAGEDORN, OF ST. LOUIS, MISSOURI.

WRENCH.

1,369,804.   Specification of Letters Patent.   Patented Mar. 1, 1921.

Application filed October 27, 1920. Serial No. 419,875.

*To all whom it may concern:*

Be it known that I, WILLIAM F. HAGEDORN, a citizen of the United States of America, residing at St. Louis and State of Missouri, have invented certain new and useful Improvements in Wrenches, of which the following is a specification.

This invention is a wrench to be used in tightening and loosening the jam nut that holds a tire stem in the proper position in an inner tube for a tire. A conventional wrench is not suitable for this work, for the reason that it is difficult, if not impossible, with it, to properly secure the nut and stem so as not to leak and because it is extremely awkward to use.

With the above and other objects in view, my invention has relation to certain novel features of construction and arrangements of parts as will be hereinafter more fully described, pointed out in the claim, and illustrated in the drawings in which—

Figure 1, is a front elevation of my device,

Fig. 2, is a central longitudinal elevation,

Fig. 3, is a cross-section along the line 3—3 of Fig. 2,

Fig. 4, is a longitudinal sectional elevation of an adapter to be used with my device, and, Fig. 5, is an end elevation of the adapter shown in Fig. 4, Numeral 6, indicates a stand or post having the base 7, with means (not shown) for securing the base to a bench. The post and base are made integral.

An eye 8 is formed integral with the post 6 at its upper end. Numeral 9 indicates a strengthening rib formed integral with the post 6 and the base 7. The eye 8, has two parallel sides and two opposite arcs of a circle. A cylindrical projection 10 extends from the eye 8 as best shown in Fig. 2. This projection and the eye 8 are made integral. An annulus 11 is formed near the external end of the projection 10.

Numeral 12 indicates the handle of my wrench, having arms 13 and a hole 14 piercing its center. Made integral with the handle 12 at its center are the hollow cylindrical projections 15 and 16. The projection 15 is of the same length as the projection 10 and of the same diameter. The projection 16 is approximately of the length equal to the height of a conventional tire casing jam nut, the inner portion of the hole being circular and of a diameter slightly greater than the diameter of a tire valve and the outer portion, hexagonal or octagonal, depending on the conformation of the jam nut with which my wrench is to be used.

The handle 12 is fitted over the projection 10 until it assumes the position shown in Fig. 2. The fit between these two elements is a rotational fit.

Numeral 17 indicates a small bolt which is secured in threaded engagement in the projection 10. The inner end of the bolt 17 is reduced to a diameter equal to the width of the annulus 11 and so positioned that this reduced end of the bolt 17 will extend into the annulus 11 when in operative position as best shown in Fig. 2. It will now be seen that the handle 12 may be rotated on the projection 10 and that the bolt 17 prevents the wrench from moving laterally on the projection 10.

Numeral 18 indicates a fragment of a tire inner-tube, and numeral 19 indicates a conventional tire stem. Numeral 20 indicates the conventional inner end of the tire stem 19 and 21 indicates the jam nut support on the inner tube. Numeral 22 indicates a conventional jam nut. The operation of my device is as follows: The tire stem with the jam nut approximately in position is pushed through the opening in the center of the handle 12 and the eye 8, until the jam nut fits into the hexagonal opening of the projection 14. The tire stem is of the same cross-sectional conformation as the eye 8 for which reason, the tire stem cannot be rotated in the eye 8. The handles 12 are now rotated thereby turning the jam nut 22. A turn in one direction tightens the nut, and a turn in the opposite direction loosens the nut.

In order to accommodate my wrench to jam nuts of different sizes and conformations, an adapter 23 may be used which consists of a cylindrical portion 24 and a jam nut socket 25, the parts 24 and 25 are connected by a swivel joint 26 best shown in Fig. 4. Adapters of different sizes may be supplied. The cylindrical portion 24 is of the diameter and conformation and length of the eye 8 and the jam nut socket is of such size as to fit in the space occupied by the jam nut in Fig. 2.

What I claim and mean to secure by Letters Patent is:

In a wrench, a stand having an opening there-through of the conformation of the cross section of a tire stem, a handle, having an opening there-through of the conformation of the cross section of a nut, a cylindrical projection formed integral with said stand, a hollow cylindrical projection formed integral with said handle, an annulus formed integral in the cylindrical projection of said stand, a screw, said screw in threaded engagement in a hole in the hollow cylindrical projection of said handle, said hollow cylindrical projection in rotative frictional engagement on the cylindrical projection of said stand so that the end of said screw protrudes into the annulus on the cylindrical projection of said stand.

In testimony whereof I affix my signature.

WILLIAM F. HAGEDORN.